June 20, 1972  S. V. VAN WASSENHOVE  3,671,110
REAR VIEW MIRROR ATTACHMENT

Filed July 8, 1970  2 Sheets-Sheet 1

INVENTOR.
SARFIEN V. VAN WASSENHOVE

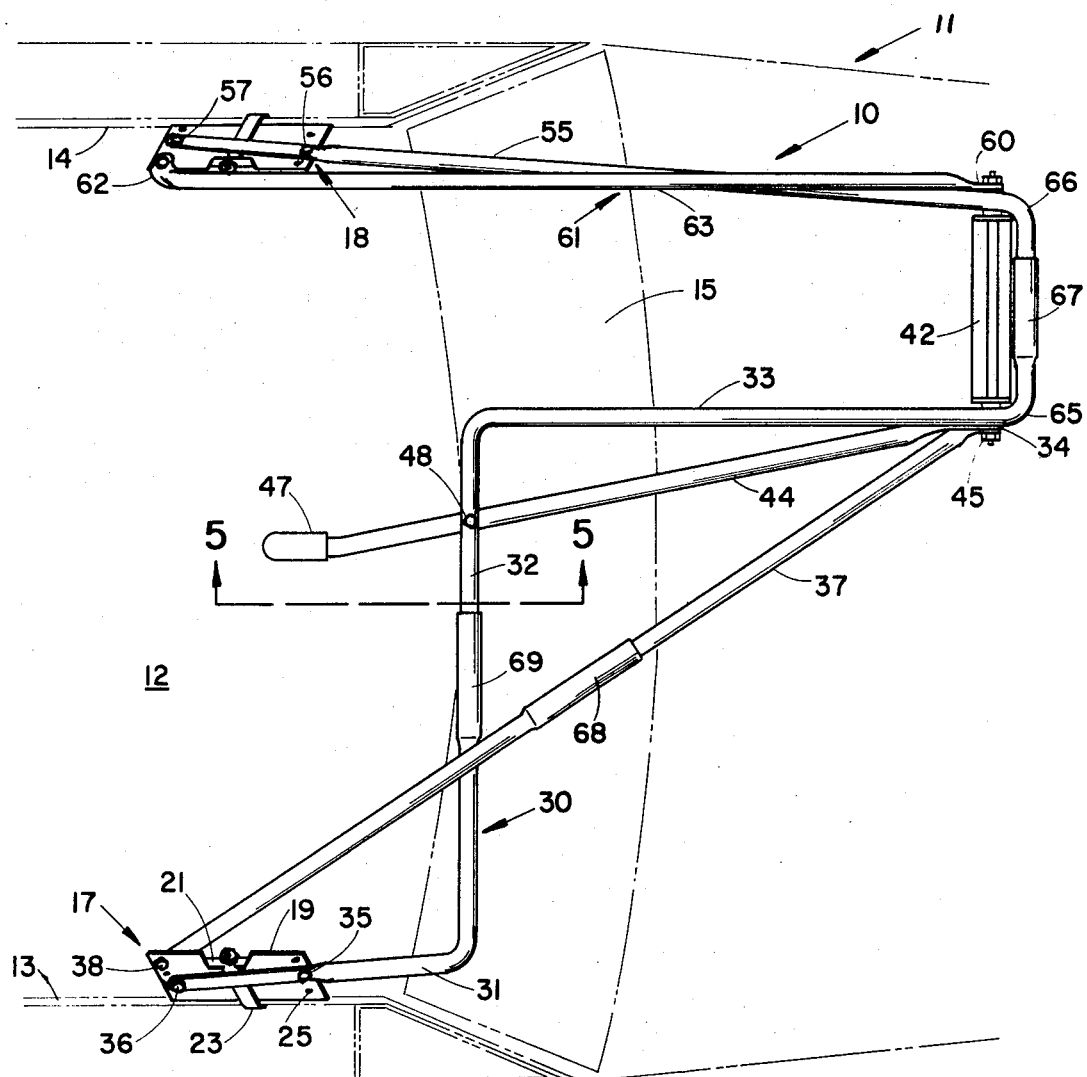

United States Patent Office 3,671,110
Patented June 20, 1972

3,671,110
REAR VIEW MIRROR ATTACHMENT
Sarfien V. Van Wassenhove, 2173 18th St.,
East Moline, Ill. 61244
Filed July 8, 1970, Ser. No. 53,190
Int. Cl. G02b 5/08
U.S. Cl. 350—307
10 Claims

ABSTRACT OF THE DISCLOSURE

A rear view mirror that is positioned outside of the automobile and forwardly of the windshield at a level above the roof of the automobile. The mirror is supported in cantilever fashion by supporting structure connected to brackets fixed to the respective left- and right-hand gutters running lengthwise of the edges of the automobile roof.

BACKGROUND OF THE INVENTION

This invention relates to a rear view mirror attachment for an automobile which is supported in cantilever fashion forwardly and outwardly of the windshield and above the roof of the car so that an operator seated in the driver's seat may view a rear view along a line of sight first to the mirror and from thence rearwardly over the roof of the automobile. Conventionally, rear view mirrors have been mounted inside of the automobile so that the driver can view rearward of the automobile through the rear window in the automobile. Also, side view mirrors have been mounted on opposite sides of the car so that the driver can view to the rear of the automobile along lines of sight extending fore-and-aft on opposite sides of the car. There has, from time to time, been some attempts to mount a periscope-type of rear view mirror inside of the automobile and to extend a line of sight by mirrors vertically through the roof or front window of the automobile and from there rearwardly. However, this latter design as well as those conventional designs have certain drawbacks to them. First, both the conventional rear view mirrors as well as the side view mirrors have limited vision for the reason that portions of the automobile block out certain segments of the landscape that is to the rear of the car. The periscope type of rear view mirror has proven quite unsatisfactory due primarily to the cost of installation and because adjustment thereof has proven to be quite difficult.

Also, with the advent of large quantities of trailers, particularly camping-type trailers, the side view mirrors have become even less useful for the reason that the trailers, being relatively wide, block even more of the landscape to the rear of the automobile. Often with the conventional type inside-mounted rear view mirror, such a trailer will almost totally block off the view through the rear window and consequently, under these circumstances, this latter type of rear view mirror is of little or no value for its intended use.

SUMMARY OF THE INVENTION

With the above in mind, it is a primary object of the present invention to provide a rear view mirror attachment which is supported in cantilever fashion forwardly of the windshield and above the roof of the automobile so that an operator within the automobile may view the mirror through the windshield and view the rear landscape and highway along a line of sight extending above the automobile.

More specifically, it is a primary object of the present invention to provide a pair of support brackets that may be rigidly mounted on the gutters on opposite sides of the automobile. The mirror is supported by forwardly projecting supports that are rigidly mounted on the brackets and which converge at their forward ends to carry the mirror substantially forwardly of the driver so that the supports do not block viewing through the mirror.

Still more particularly, it is an object of the present invention to provide with the supports for the mirror braces that are fixed at their rear ends to the respective brackets and at their forward ends to the supports adjacent their attachments to the mirror. The braces extend from the brackets to the mirror at different angles than the basic supports so that the entire attachment structure is rigidly mounted on the automobile and will not vibrate except through the normal vibration of the automobile.

More specifically, it is the object of the present invention to provide a Z-shaped main support that has a rear portion connected to the bracket on the right side of the automobile, a transverse horizontal portion extending inwardly from the rear portion and a fore-and-aft extending forward portion extending from the inner end of the transverse portion to the mirror. The brace extends diagonally from the bracket to a forward end fixed to the forward end of the main support and crosses and engages the transverse portion of that support so as to force that portion downwardly. Thus, the two pieces, the support and brace, become a rigid structure in their support of the mirror.

BRIEF DESCRIPTION OF THE DRAWINGS

FIG. 3 is a plan view of a portion of an automobile and the rear view attachment.

FIG. 5 is an enlarged sectional view taken substantially along the line 5—5 of FIG. 3.

FIG. 6 is an enlarged sectional view taken substantially along the line 6—6 of FIG. 1.

DESCRIPTION OF THE PREFERRED EMBODIMENT

Figure 1:
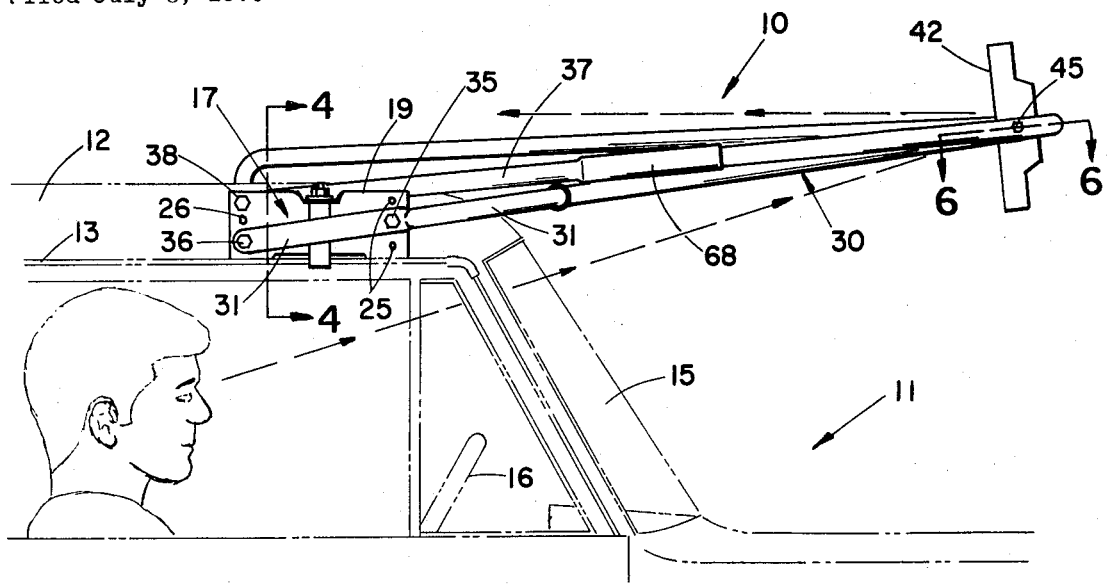
FIG. 1 is a side view of a portion of an automobile and the rear view attachment as taken from the right side of the automobile.
Figure 2:
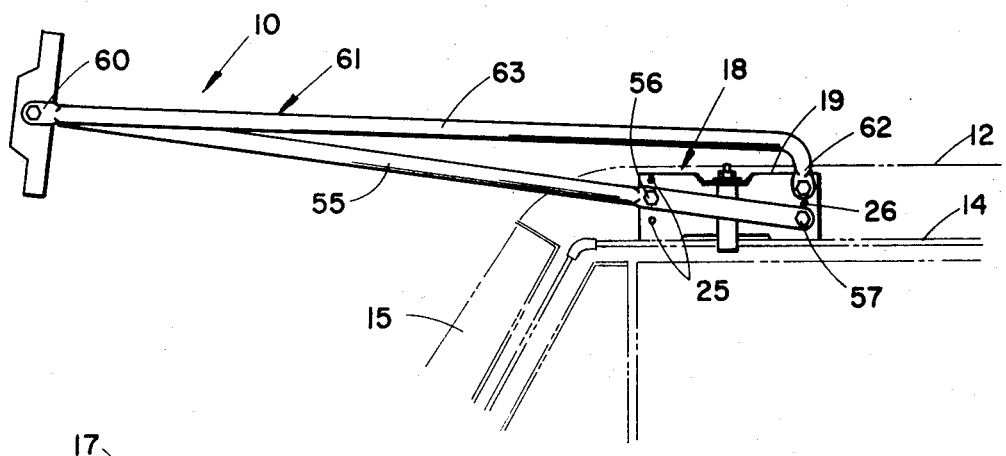
FIG. 2 is a view similar to FIG. 1 but taken from the left side of the automobile.
Figure 4:
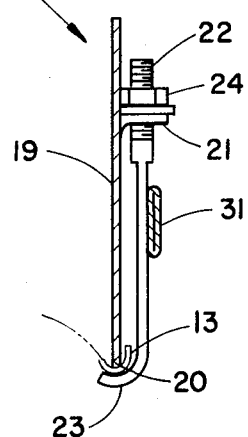
FIG. 4 is a sectional view taken substantially along the line 4—4 of FIG. 1.

Referring now to the drawings, a rear view attachment 10 is supported on an automobile 11 having a roof 12 and fore-and-aft extending gutters 13, 14 on the right-, and left-, fore-an-aft extending edges of the roof. The gutters 13, 14 serve the purpose of normally directing rain water coming off of the roof off of the automobile. A windshield 15 is provided forward of an operator's station or driver's seat on the left side of the automobile near a steering wheel 16.

The attachement 10 is composed of a pair of basic support brackets 17, 18 that seat in the respective gutters 13, 14. The bracket 17 is composed of an upright plate 19 having its lower edge 20 seated in the gutter 13. The plate 19 is disposed in a fore-an-aft vertical direction and has a midportion flanged or bent horizontally at 21 and has an opening for a shank member 22 having a lower edge hook-shaped end 23 that fits beneath the trough or gutter 13. By tightening a nut 24 above the flange 21, the hook 23 will force the plate 19 to sit rigidly in the gutter 13 and it is difficult if not impossible to remove the plate 19 from the gutter. The bracket structure 18 on the left-hand side of the automobile that fits in the gutter 14 is substantially identical to the bracket structure 17 and it is believed description is not therefore necessary. The bracket plates 19 are each provided with a series of vertically spaced openings 25, 26 adjacent their front and rear edges. Extending from the right bracket plate 19 is a Z-shaped mirror support 30 having a fore-and-aft extending rear portion 31 and a transverse horizontally disposed portion 32 extending from the forward end of the forward portion 31 inwardly to an inner end in junction with a forward fore-and-aft extending portion 33 that has its forward end 34 positioned forwardly of the windshield 15 and above the automobile roof 12. As may best be seen from viewing FIG. 1, the rear portion 31 is bolted at 35, 36 to the plate 19, the respective openings through which the bolts 35, 36 project determining the angle of rise of the Z-shaped support 30. As is readily apparent, the angle of rise may be adjusted by positioning the bolts in various of the openings 25, 26. Also, the rearward most portion of the rear portion 31 is flattened out and fits outside the shank 22.

Extending also from the bracket plate 19 is a diagonal brace 37 having its rear end connected to the plate 19 by a bolt 38 that extends through one of the rear openings 26. The forward end of the brace is connected to the forward end 34 of the support 31 by means of a pivot bolt structure 40 that extends through both the diagonal brace 37, the forward end 34 and the right side plate 41 of mirror 42. The diagonal brace 37 crosses the transverse portion 32 and bears downwardly against that portion. Reviewing FIG. 1, it will be noted that the brace 37 extends forwardly at a lesser angle, with respect to the horizontal, than the support 30 and consequently the brace 37 exerts a downward force on the cross or transverse portion 32. Reviewing FIG. 5 for the moment, the forward end 34 is positioned on a bolt 40 that has its head end inside of the supporting plate 41 of the mirror 42. The bolt extends through a suitable opening in the forward end 34, a flattened forward end of the diagonal brace 37 and a flattened forward end of a secondary brace 44. A nut 45 fits on the threaded end portion of the bolt 40. A rubber gasket 46 fits between the mirror plate 41 and forward end 34 and consequently permits the mirror to be adjusted and to be frictionally held in a desired adjusted position.

The function of the secondary brace 44 may best be understood from viewing FIGS. 3, 5 and 6. The brace 44 extends rearwardly from the bolt 40 and has a rear end flattened and provided with a plastic sock 47. The rearward most end with the sock 47 rides against the upper surface of the roof 12. The brace 44 passes under the transverse portion 32 just outwardly of its juncture or corner with the fore-and-aft extending forward portion 33. Extending through the transverse portion 32 and the brace 44 is a vertical bolt 48. A nut 49 holds the bolt 48 in a fixed position relative to the brace 44 and a pair of adjusting nuts 50, 51, fit above and below the transverse portion 32 and serve with the bolt 48 as adjusting means for exerting an upward pressure on the transverse piece 32. Thus, the diagonal brace 37, due to its inclination, creates a downward pressure on the transverse piece 32 and the brace 44 exerts an upward force on the same piece 32. The two braces in combination with the support 30, therefore, are capable of providing a very rigid structure, rigidly carried on the support bracket 17 which holds the mirror 42 in a very rigid-like manner and in cantilever fashion forwardly of the driver's seat.

Referring now to the left side of the mirror 42, there is provided a left-hand support member 55 that is carried at an incline with respect to the horizontal on its support bracket 19 by means of bolts 56, 57 that extend through the bracket openings 25, 26. The forward end of the elongated support 55 is flattened slightly and receives a bolt 58 that extends through the left-hand mirror plate 59 and through the forward end 60 of a fore-and-aft extending brace 61. The brace 61 is L-shaped having a vertical leg portion 62 bolted to a rear opening 26 and a horizontal fore-and-aft extending portion 63 that has the aforementioned forward end 60 fixed to the mirror by bolt 58. Thus, the brace 61 and the support 55 serve as a triangular-shaped structural framework that supports the left end of the mirror 42. The L-shaped brace 61 prevents vibration of the mirror 42 in a vertical direction.

Referring again to FIG. 6, the forward end 34 of the right-hand support 31, and the forward end of the left-hand support 55 extends from right-angle corners 65, 66 to transverse horizontal ends directed toward one another forwardly of the mirror 42 and which are interconnected by a telescoping tubular part 67. The tubular member 67 fits snugly on the transverse continuation of the support 55, and consequently the rigidity created in the structure to the right of the mirror 42 is transferred to the structure on the left side of the mirror and the rigidity of the structure on the left side of the mirror is transferred to that on the right side of the mirror.

For purposes of making the entire unit adaptable for various transverse spacings between the gutters 13, 14, the diagonal brace 37 is composed of a front and rear piece which is also interconnected by a telescoping part 68 and the transverse portion is composed of inner and outer sections that are interconnected by a telescoping part 69. The telescoping parts 68, 69 snugly fit their respective inner portions and permit little or no play at their junctures. It should also be recognized that the telescoping members 67–69 permit the entire rear view mirror structure to be removed and packaged in a relatively small container for purpose of storage.

In operation, the two brackets 17, 18 are rigidly supported on the respective gutters 13, 14 and upon tightening of all the respective bolts on the entire attachment, the attachment structure becomes rigid with the automobile and the vibration due to travel over the road are not transmitted to the mirror in quantities greater than that created by the road itself. As may best be seen from viewing FIG. 1, the mirror is supported in cantilever fashion a considerable distance forwardly of the car. Consequently, the preventing of vibrations is of extreme importance in this structure. Also it should be recognized that the mirror structure 42 is extremely wide as rear view mirrors are currently considered, and consequently serves to cover a wide area of the road rearwardly of the automobile.

I claim:

1. A rear view mirror attachment for an automotive-type vehicle having a front windshield, a roof, and opposite right- and left-hand fore-and-aft extending and upwardly opening gutters running lengthwise of and along opposite sides of the roof, said attachment comprising: a pair of brackets with means thereon for rigidly attaching the brackets to the respective right- and left-hand gutters; left-hand and right-hand elongated rigid supports fixed to the respective right-hand and left-hand brackets and projecting forwardly therefrom in cantilever fashion to forward transversely spaced ends forwardly of and above the windshield; said right-hand support extending first forwardly from the bracket to a transversely inwardly extending portion and from thence to a forwardly extending forward portion to its respective forward end; a mirror extending between and connected to the forward ends for viewing by an operator within the vehicle; and a brace extending diagonally across and in downward contact with the midportion from a rear end fixed to said right-hand bracket to a forward end adjacent to and fixed to said forward portion, said brace exerting a downward pressure on the right-hand support at said contact.

2. The invention as set forth in claim 1 in which said right-hand support projects from said right-hand bracket at a predetermined angle with respect to the horizontal and said brace projects from the bracket at a lesser angle with respect to the horizontal.

3. The invention as set forth in claim 1 further characterized by a fore-and-aft extending brace having a rear end in engagement with the roof and a forward end connected to the forward ends of the diagonal brace and support member; and means extending between the support member and fore-and-aft extending member for exerting a force therebetween opposite to that exerted by the diagonal brace on the support.

4. The structure as set forth in claim 1 in which the transverse portion is composed of telescoping parts so as to accommodate different transverse spacings between gutters.

5. The structure as set forth in claim 4 in which the diagonal brace is composed of telescoping parts so as to accommodate different transverse spacings between gutters.

6. The structure as set forth in claim 1 further characterized by an L-shaped brace having a vertical leg portion fixed to said left-hand bracket and a fore-and-aft leg portion extending to and connected to a forward end fixed to the forward end of the left-hand support.

7. The structure as set forth in claim 1 in which the forward ends of the supports are interconnected by a transverse section extending forwardly of the mirror and integrally joining the respective forward ends of the supports.

8. A rear view mirror attachment for an automotive-type vehicle having a front windshield, a roof and opposite left- and right-hand fore-and-aft extending gutters running lengthwise of and along opposite sides of the roof, said attachment comprising: a rear view mirror positioned above the roof and forwardly of the windshield on the driver's side of the vehicle; a pair of support brackets having means rigidly fixing them to the respective left- and right-hand gutters; a pair of elongated fore-and-aft extending left-hand mirror supports having vertically spaced rear ends and rigidly fixed at their rear ends to the bracket on the left-hand gutter and converging forwardly therefrom to forward ends adjacent the left side of said mirror; a pair of elongated right-hand mirror supports having vertically spaced rear ends fixed to said right-hand bracket support and extending forwardly, upwardly and inwardly above said roof closely adjacent to forward ends forwardly of said windshield and adjacent to the right side of said mirror; and means connecting the forward ends of the left- and right-hand supports to the left and right sides respectively of said mirror whereby said mirror will be supported in cantilever fashion forwardly of the windshield and above the roof.

9. The structure as set forth in claim 8 in which the forward ends of said elongated supports are connected to one another and to said mirror along a transverse horizontal axis and said means connecting the mirror to said supports includes a pivot on said axis.

10. The structure as set forth in claim 9 in which the respective pair of right-hand supports cross one another and engage one another between their forward and rear ends to create a vertical force therebetween at the location of engagement.

References Cited
UNITED STATES PATENTS

| | | | |
|---|---|---|---|
| 2,999,427 | 9/1961 | Newcomb | 350—307 |
| 3,166,197 | 1/1965 | Caylor et al. | 350—307 |
| 2,803,160 | 8/1957 | Marston | 350—302 |
| 1,814,667 | 7/1931 | Cowdrey | 350—302 |

DAVID SCHONBERG, Primary Examiner

M. J. TOKAR, Assistant Examiner